(12) United States Patent
Tune

(10) Patent No.: US 8,090,953 B2
(45) Date of Patent: *Jan. 3, 2012

(54) INFORMATION STORAGE SYSTEM

(75) Inventor: Andrew Dominic Tune, Surrey Hills (AU)

(73) Assignee: Splitlock Holdings Pty Ltd., Albury (AU)

( * ) Notice: Subject to any disclaimer, the term of this patent is extended or adjusted under 35 U.S.C. 154(b) by 144 days.

This patent is subject to a terminal disclaimer.

(21) Appl. No.: 12/703,722

(22) Filed: Feb. 10, 2010

(65) Prior Publication Data

US 2010/0146288 A1   Jun. 10, 2010

Related U.S. Application Data

(63) Continuation of application No. 10/511,254, filed as application No. PCT/AU03/00433 on Apr. 11, 2003, now Pat. No. 7,698,560.

(30) Foreign Application Priority Data

Apr. 11, 2002   (AU) .................................. PS1690/02

(51) Int. Cl.
  *H04L 9/32* (2006.01)
  *G06F 21/00* (2006.01)
  *G06Q 20/00* (2006.01)
  *H04K 1/00* (2006.01)
(52) U.S. Cl. ........................... 713/179; 713/193; 705/71
(58) Field of Classification Search ......................... None
  See application file for complete search history.

(56) References Cited

U.S. PATENT DOCUMENTS 3,956,615 A   5/1976   Anderson et al. ............... 705/72

(Continued)

FOREIGN PATENT DOCUMENTS

WO   WO 00/38034   6/2000

(Continued)

OTHER PUBLICATIONS

Friedrich, "IMB DB2 Anonymous Resolution: Knowledge Discovery Without Knowledge Disclosure", May 2005, IBM DB2 Anonymous Resolution Whitepaper, p. 1-23.

(Continued)

*Primary Examiner* — Christopher Revak
(74) *Attorney, Agent, or Firm* — Blakely, Sokoloff, Taylor & Zafman

(57) ABSTRACT

A system for storing information having a predetermined use which requires the information to be secured. The information may comprise credit card details used to complete a transaction. The system includes: (a) A client system for storing an encoded version of the information and an identifier. The encoded version is generated from first data of the information and an encoded version of the second data of the information. The information can be generated from the first data and the second data, and the predetermined use is infeasible with only one of the first data and the second data. (b) A remote server for storing the second data and an encoded identifier generated from the identifier. The client system sends at least the encoded version of the second data to the remote server. The client system or the remote server is able to generate the information from the first data and the second data. Accordingly, only part of the information to be secured is stored locally on the client system, while the other part is stored on the remote server, and neither the client system nor the remote server have a record of the entire information.

22 Claims, 10 Drawing Sheets

U.S. PATENT DOCUMENTS

| | | | |
|---|---|---|---|
| 4,123,747 A | 10/1978 | Lancto et al. | 713/185 |
| 5,530,757 A | 6/1996 | Krawczyk | |
| 5,826,245 A | 10/1998 | Sandberg-Diment | 705/44 |
| 5,839,119 A | 11/1998 | Krsul | |
| 5,937,066 A | 8/1999 | Gennaro | |
| 6,012,144 A | 1/2000 | Pickett | 726/26 |
| 6,070,154 A | 5/2000 | Tavor et al. | 705/55 |
| 6,157,920 A | 12/2000 | Jakobsson | |
| 6,240,184 B1 | 5/2001 | Huynh | |
| 6,393,447 B1 | 5/2002 | Jakobsson | |
| 6,411,715 B1 | 6/2002 | Liskov | |
| 6,446,052 B1 | 9/2002 | Juels | |
| 6,598,031 B1 | 7/2003 | Ice | 705/50 |
| 6,722,339 B2 | 4/2004 | Elliott | |
| 6,813,354 B1 | 11/2004 | Jakobsson | |
| 6,850,916 B1 | 2/2005 | Wang | 705/64 |
| 6,901,512 B2 | 5/2005 | Kurn | |
| 6,925,563 B1 | 8/2005 | Jennings | |
| 6,950,517 B2 | 9/2005 | Hawkes et al. | 380/37 |
| 6,970,070 B2 | 11/2005 | Juels | |
| 6,985,583 B1 | 1/2006 | Brainard | |
| 7,127,067 B1 | 10/2006 | Wachtler | |
| 7,187,772 B2 | 3/2007 | Vora | |
| 7,197,639 B1 | 3/2007 | Juels | |
| 7,219,368 B2 | 5/2007 | Juels | |
| 7,240,192 B1 | 7/2007 | Paya | |
| 7,254,233 B2 | 8/2007 | Hawkes et al. | 380/37 |
| 7,260,724 B1 | 8/2007 | Dickinson | |
| 7,269,261 B1 | 9/2007 | Jennings | |
| 7,275,685 B2 | 10/2007 | Gray et al. | 235/380 |
| 7,298,243 B2 | 11/2007 | Juels | |
| 7,305,084 B2 | 12/2007 | Hawkes et al. | 380/37 |
| 7,519,830 B2 * | 4/2009 | Mihm et al. | 713/187 |
| 7,698,560 B2 * | 4/2010 | Tune | 713/179 |
| 2001/0055388 A1 | 12/2001 | Kaliski | |
| 2002/0046189 A1 | 4/2002 | Morita et al. | |
| 2002/0071560 A1 | 6/2002 | Kurn | |
| 2002/0071561 A1 | 6/2002 | Kurn | |
| 2002/0071563 A1 | 6/2002 | Kurn | |
| 2002/0071564 A1 | 6/2002 | Kurn | |
| 2002/0071565 A1 | 6/2002 | Kurn | |
| 2002/0071566 A1 | 6/2002 | Kurn | |
| 2002/0071567 A1 | 6/2002 | Kurn | |
| 2002/0073309 A1 | 6/2002 | Kurn | |
| 2002/0141593 A1 | 10/2002 | Kurn | |
| 2003/0046198 A1 | 3/2003 | Knapp | |
| 2003/0046202 A1 | 3/2003 | Knapp | |
| 2003/0046210 A1 | 3/2003 | Vora | |
| 2003/0046213 A1 | 3/2003 | Vora | |
| 2003/0048906 A1 | 3/2003 | Vora | |
| 2003/0101346 A1 | 5/2003 | Barron et al. | |
| 2004/0039924 A1 | 2/2004 | Baldwin | |
| 2004/0111608 A1 | 6/2004 | Oom Temudo de Castro | |
| 2004/0210763 A1 | 10/2004 | Jonas | |
| 2004/0222878 A1 | 11/2004 | Juels | |
| 2005/0157880 A1 | 7/2005 | Kurn | |
| 2006/0190378 A1 | 8/2006 | Szydlo | |
| 2007/0076867 A1 | 4/2007 | Yeung | |
| 2007/0143210 A1 | 6/2007 | Yeung | |
| 2007/0154018 A1 | 7/2007 | Watanabe | 380/273 |
| 2007/0177735 A1 | 8/2007 | Mimih | |
| 2007/0186105 A1 | 8/2007 | Bailey | |
| 2007/0289002 A1 | 12/2007 | van der Horst | |
| 2008/0019573 A1 | 1/2008 | Baltatu | |
| 2008/0046737 A1 | 2/2008 | Mihm et al. | 713/176 |
| 2008/0170693 A1 | 7/2008 | Spies et al. | 380/277 |
| 2008/0208697 A1 | 8/2008 | Kargman et al. | 705/17 |
| 2009/0261162 A1 | 10/2009 | Kargman et al. | 235/380 |
| 2011/0102546 A1 * | 5/2011 | Dhuse et al. | 348/46 |
| 2011/0106769 A1 * | 5/2011 | Baptist et al. | 707/652 |
| 2011/0106909 A1 * | 5/2011 | Gladwin | 709/217 |
| 2011/0107112 A1 * | 5/2011 | Resch | 713/193 |

FOREIGN PATENT DOCUMENTS

| | | |
|---|---|---|
| WO | WO 00/41357 A1 | 7/2000 |
| WO | WO 01/30016 A2 | 4/2001 |

OTHER PUBLICATIONS

"Increasing availability and security of an authentication service", L Gong., IEEE Journal on Selected Areas in Communications, vol. 11, No. 5, Jun. 1993, pp. 657-662.

"A New Two-Server Approach for Authentication with Short Secrets", J. Brainard, et al.; RSA Laboratories, 13 pages, 2003.

"Secret Sharing and Splitting", Laurence Grant, et al.; 7 pages, Dec. 16, 2002.

Nightingale: Private Data Managmen ; RSA-SF Development Center, Aug. 9, 2002, 17 pages (2-sided).

Ed Scannell, InfoWorld, "IBM Unveils Privacy Software"—PCWorld, HDNA The Sony BRAVIA HDTV, 1-3 pp, http://www.pcworld.com/printable/article/id,120992/printable.html, May 24, 2005.

"DB2Entity Analytic Solutions", IBM, 2pp, http://www-306.ibm.com/software/data/db2/eas/, May 2005.

* cited by examiner

INFORMATION STORAGE SYSTEM

CROSS-REFERENCE TO RELATED APPLICATIONS

The present patent application is a continuation of application Ser. No. 10/511,254, filed Apr. 27, 2005, now U.S. Pat. No. 7,698,560, which is a non-provisional application of International Application No. PCT/AU03/00433, filed Apr. 11, 2003.

FIELD OF THE INVENTION

The present invention relates to an information storage system, and in particular to a process and system for storing information having a predetermined use which requires said information to be secured.

BACKGROUND

The secure storage of electronic information is a major concern for many organisations. In particular, the storage of customer information creates risks of privacy violations and theft of potentially valuable information. For example, many organisations store credit card information for their customers. The storage of a customer's credit card information obviates the need for the customer to re-enter the same credit card number, expiry date, and card name every time a credit card transaction is processed. Organisations with the ability to avoid this inconvenience and process transactions rapidly are likely to be more attractive to their customers. For example, the storage of credit card information enables the use of so-called 'one click' purchasing over the Internet, as described in U.S. Pat. No. 5,960,411, thereby increasing the completion rate of online purchases. Moreover, the storage of sensitive information such as credit card numbers avoids the need to re-transmit the information over potentially insecure communications networks, making it less vulnerable to theft during transmission, by transmission monitoring, for example.

On the other hand, the storage of such information is unlikely to ever be totally secure, and the stored information is always at least potentially vulnerable to theft by hackers, malicious staff, contractors, cleaners, IT services suppliers, etc. This risk is always present for any organisation that keeps such information on record. The loss of such information is embarrassing and is potentially extremely costly for the organisation. It is desired to provide a process and system that alleviate the above difficulties, or at least provide a useful alternative.

SUMMARY OF THE INVENTION

In accordance with the present invention there is provided a system for storing information having a predetermined use which requires said information to be secured, including:
  a client system for generating first data and second data from said information, such that said information can be generated from said first data and said second data, and said predetermined use is infeasible with only one of said first data and said second data, and for storing an identifier with said first data; and
  a remote server for storing said second data with an encoded identifier generated from said identifier.

The present invention also provides a system for storing information having a predetermined use which requires said information to be secured, including:
  a client system for storing an encoded version of said information and an identifier, the encoded information having been generated from first data of said information and an encoded version of second data of said information, wherein said information can be generated from said first data and said second data, and said predetermined use is infeasible with only one of said first data and said second data; and
  a remote server for storing said second data and an encoded identifier generated from said identifier;
  wherein said client system is adapted to send at least the encoded version of the second data to said remote server.

The present invention also provides a process for storing information having a predetermined use which requires said information to be secured, including generating first data and second data from said information, such that said information can be generated from said first data and said second data, and said predetermined use cannot be performed using only one of said first data and said second data.

The present invention also provides a process for storing information having a predetermined use which requires said information to be secured, including:
  receiving an identifier and first data from a client system having second data, said first data and said second data being such that said information can be generated from said first data and said second data, and said predetermined use cannot be performed using only one of said first data and said second data; and
  storing said first data with an encoded identifier generated from said identifier, without storing said identifier.

The present invention also provides a process for generating information having a predetermined use which requires said information to be secured, including:
  determining, on the basis of an identifier, first data of said information;
  receiving second data of said information from a remote server; and
  generating said information from said first data and said second data, wherein said predetermined use is infeasible with only one of said first data and said second data.

The present invention also provides a process for generating information having a predetermined use which requires said information to be secured, including:
  receiving an identifier;
  determining first data of said information on the basis of said identifier; and
  sending said first data to a client system to enable said information to be generated from said first data and second data of said information, wherein said predetermined use is infeasible with only one of said first data and said second data.

The present invention also provides a process for generating information having a predetermined use which requires said information to be secured, including:
  determining, on the basis of an identifier, an encoded version of said information, the encoded information having been generated from first data of said information and an encoded version of second data of said information; and
  sending said identifier and said encoded information to a remote server for generation of said information from said first data and said second data, wherein said predetermined use is infeasible with only one of said first data and said second data.

The present invention also provides a process for generating information having a predetermined use which requires said information to be secured, including:

receiving an identifier and an encoded version of said information;

determining first data of said information on the basis of said identifier;

generating said information from said first data and second data of the encoded information, wherein said predetermined use is infeasible with only one of said first data and said second data;

using said information for said predetermined use; and discarding said information.

Preferred embodiments of the present invention provide processes that allow an organisation to store only part of a customer's credit card number locally on a client system, sending the other part to a remotely located server for safe keeping. This reduces the risk of theft of the credit card number because neither the client system nor the server keeps a record of the entire number. Neither is the entire number ever transmitted in a single transmission between the client system and the server. When a charge needs to be applied to such a card, the two parts are extracted from the respective systems and then briefly united, solely for the purpose of sending a transaction to a banking system, and then the record of the full number is destroyed again. Thus the risk of credit card number theft is greatly reduced.

BRIEF DESCRIPTION OF THE DRAWINGS

Preferred embodiments of the present invention are hereinafter described, by way of example only, with reference to the accompanying drawings, wherein.

DETAILED DESCRIPTION OF THE PREFERRED EMBODIMENT

Figure 1:
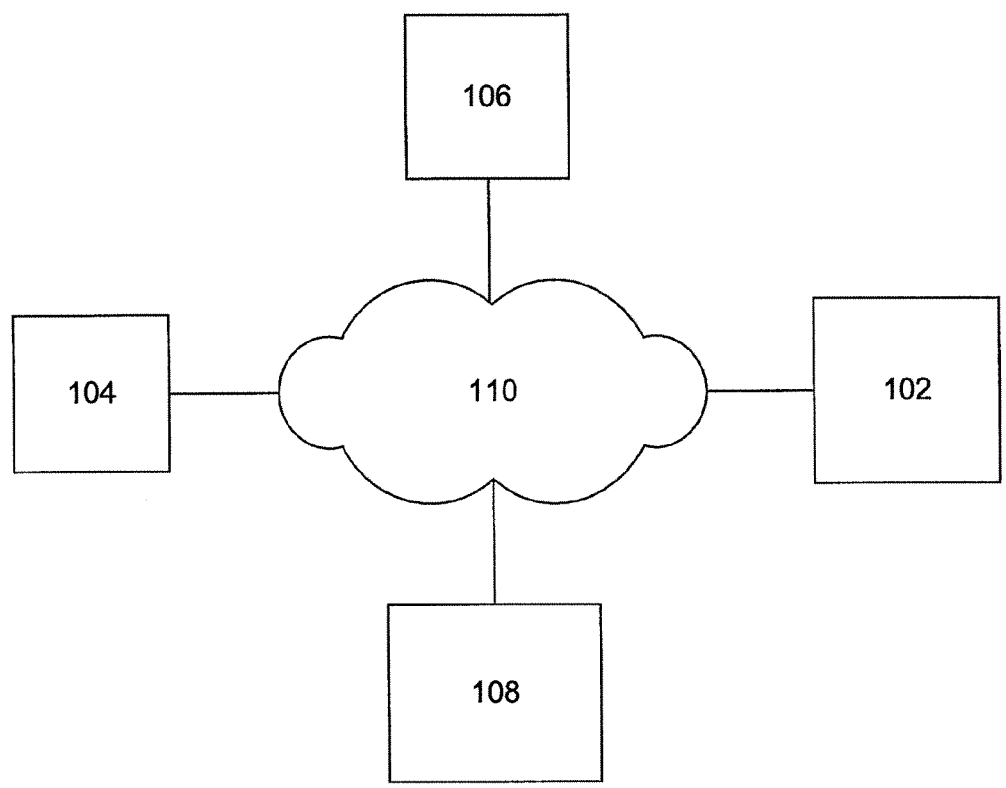
FIG. 1 is a schematic diagram of a preferred embodiment of an information storage system.
Figure 2:
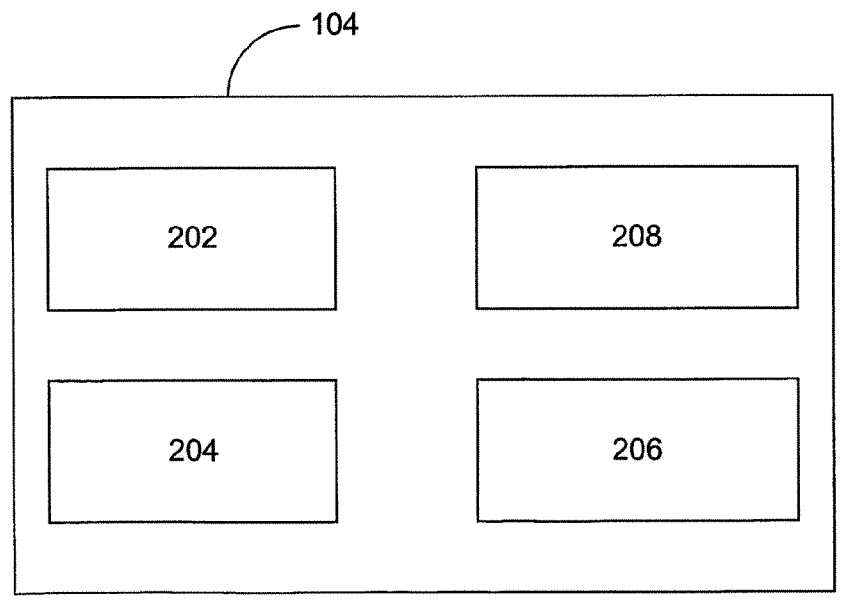
FIG. 2 is a block diagram of a client system of the information storage system.
Figure 3:
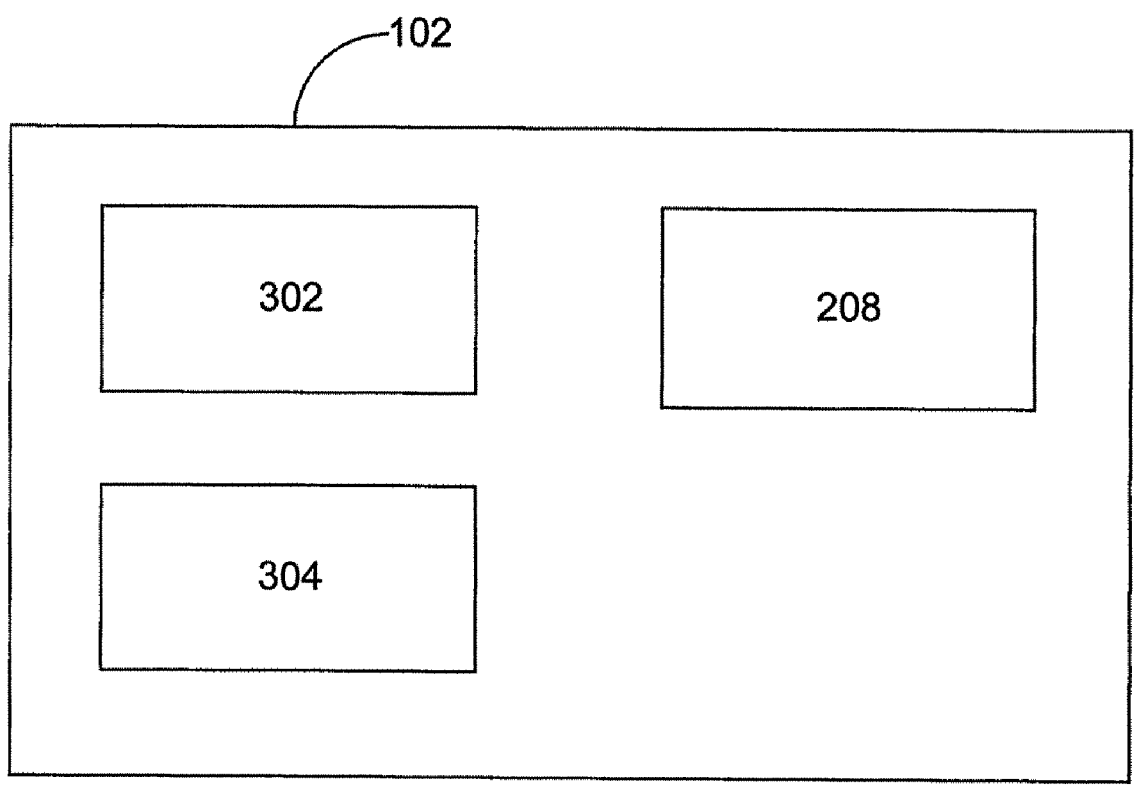
FIG. 3 is a block diagram of an information server of the information storage system.

As shown in FIG. 1, an information storage system includes an information server 102, a client system 104, a secure hash server 106, and, in the case of the second embodiment, a transaction server 108. The servers are interconnected by a communications network 110, such as the Internet. The client system 104 and servers 102, 106, 108 are standard computer systems, such as Intel™ x86-based personal computer systems running a Microsoft Windows™ operating system. However, to improve performance of the information storage system, the servers 102, 106, 108 can alternatively be high-performance network servers, such as Sun Fire™ servers available from Sun Microsystems, Inc™. As shown in FIG. 2, the client system 104 includes client modules 202, a customer database 204, and new customer data 206. The client system 104 optionally includes transaction processing modules 208, as described below. As shown in FIG. 3, the information server 102 includes server modules 302, and an information registry 304. The information server 102 may include transaction processing modules 208.

The components 102 to 108 of the information storage system execute information storage processes that provide secure storage of sensitive or valuable information such as credit card numbers by dividing the information into at least two components such that the components do not have individual worth or use value, and the information can only be put to its normal sensitive or valuable use when reassembled from the components. The components are stored separately at different physical locations, and are only reassembled when required for a predetermined use. The reassembled information is destroyed as soon as it has been used. In the case of a credit card number, this entails dividing the number into two portions, storing the portions separately, and reassembling them to process a credit card transaction. As soon as the transaction details have been sent to an acquiring institution for completing the transaction, the reassembled number is destroyed. As neither portion of the credit card number can be used to process a financial transaction without the other portion, theft of a database containing either portion of the number is of little consequence unless the complementary portion is also obtained. Moreover, even if both databases are stolen, the components of a credit card number cannot be matched up because the components do not share any database keys, as described below. Furthermore, the thief must know how to generate the credit card number from its component portions.

In any case, the communication of each portion over the network 110 is digitally signed and encrypted using 128-bit encryption, making it infeasible to obtain any portion by eavesdropping on the communications. In the described embodiment, the information storage and transaction processes are implemented as software modules executed by the system components 102 to 108. However, it will be apparent that modules of the system may be distributed over a variety of locations, and that at least part of the modules may be alternatively implemented as one or more dedicated hardware components, such as application-specific integrated circuits (ASICs).

The client system 104 may be owned and operated by an organisation that wishes to maintain information on its customers, and, in particular, wishes to store credit card information for its customers. Customer information is typically maintained in a customer database, such as the customer database 204 stored on hard disk storage of the client system 104. The organisation stores this information in the database 204 using a unique customer number as a database key under which the information is stored. The information may include, for example, the customer's name, address, credit card information, and account data, such as a standing transaction amount, as shown in the table below.

| | | |
|---|---|---|
| Customer number: | 1025543 | } Organisation-specific information |
| Standing transaction amount: | $25 | |
| Cardholder: | Roger W Smith | |
| Card type: | VISA | |

| | | |
|---|---|---|
| -continued | | |
| Expiry date: | May 2003 | Generic credit card information |
| Card number: | 3647 3495 2341 1942 | |

However, this customer data is vulnerable to theft, constituting a significant risk on the part of the customer and the organisation storing the data. To counter this risk, the information storage system divides sensitive information into at least two components. In the case of credit card information, the credit card number is divided into two portions. The credit card number is stored using an information storage process, comprising a client storage process of the client modules 202 executed by the client system 104 and a storage process of the server modules 302 executed by the information server 102, as described below.

New customer information received by the organisation is received by the client system 104, and stored as new customer data 206. For a new customer, this information typically includes personal details of the customer, including name, address, and credit card information. In the case of an existing customer of the organisation, the new customer data includes credit card information for a new credit card that the customer wishes to use when conducting financial transactions with the organisation. The credit card information is verified using standard verification techniques, which can include contacting credit agencies to ensure that the customer does not constitute a bad credit risk.

Figure 4:
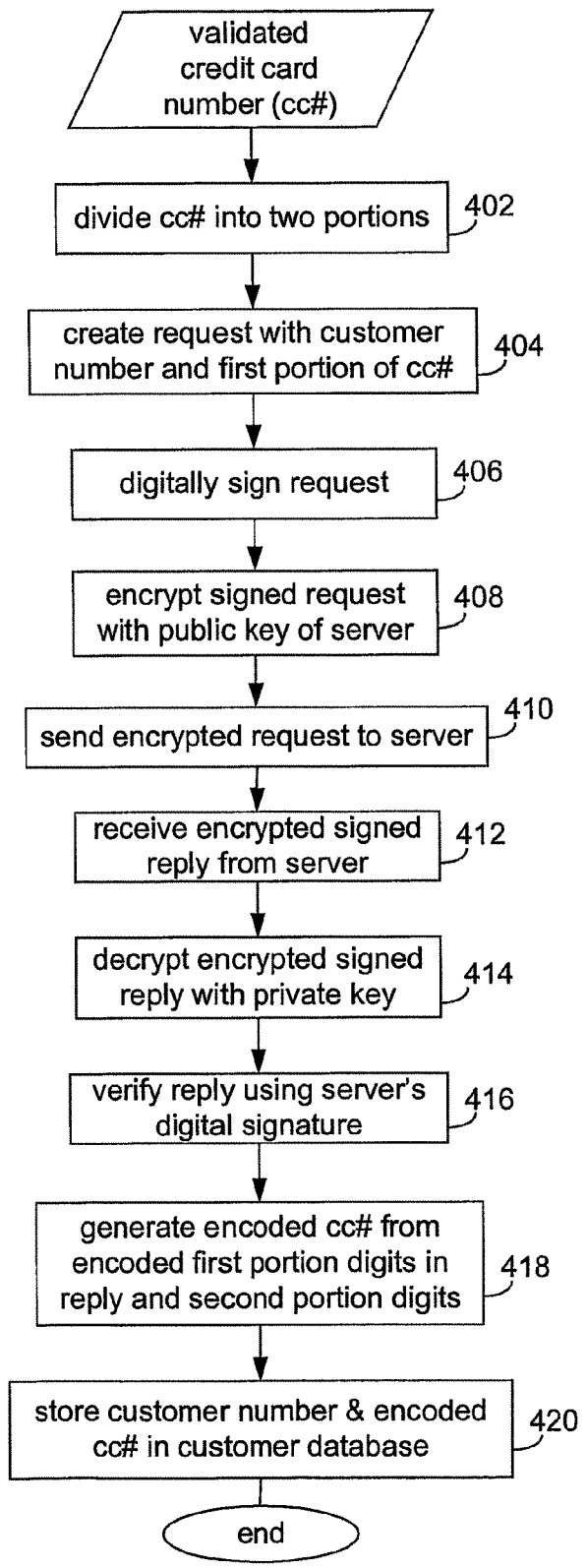
FIG. 4 is a flow diagram of an information storage client process executed by the client system.

After the credit card details have been validated, the client system 104 executes a client information storage process, as shown in FIG. 4. The process begins at step 402 by dividing the credit card number into two portions. In the described embodiment, a sixteen digit credit card number is split into two portions, comprising a first portion formed by the middle eight digits, and a second portion formed by the first four digits and the last four digits of the number. However, it will be apparent that the number can be divided in many ways, so long as the division used is known, as described below. At step 404, a request message is constructed including a unique customer number assigned to the customer, and the first portion as follows:

| | |
|---|---|
| 1025543 | 3495 2341 |

At step 406, this message is digitally signed. To sign the message, a hash value is generated from the message content, and the resulting hash value is encrypted with a private encryption key of the client system 104. All encryptions are based on the standard RSA public key encryption scheme, described at http://www.rsa.com; however, it will be apparent that other encryption schemes can alternatively be used. The encrypted hash, being the signature of the client system 104, is added to the message, as follows:

| | | |
|---|---|---|
| 1025543 | 3495 2341 | Signature of Client |

At step 408, the entire message is encrypted using a public encryption key of the information server 102. This ensures that the message can only be decrypted by the information server 102. At step 410, the encrypted message is sent to the information server 102 using a suitable communications protocol, such as TCP/IP. The process then waits to receive a reply from the information server 102 at step 412.

Figure 5:
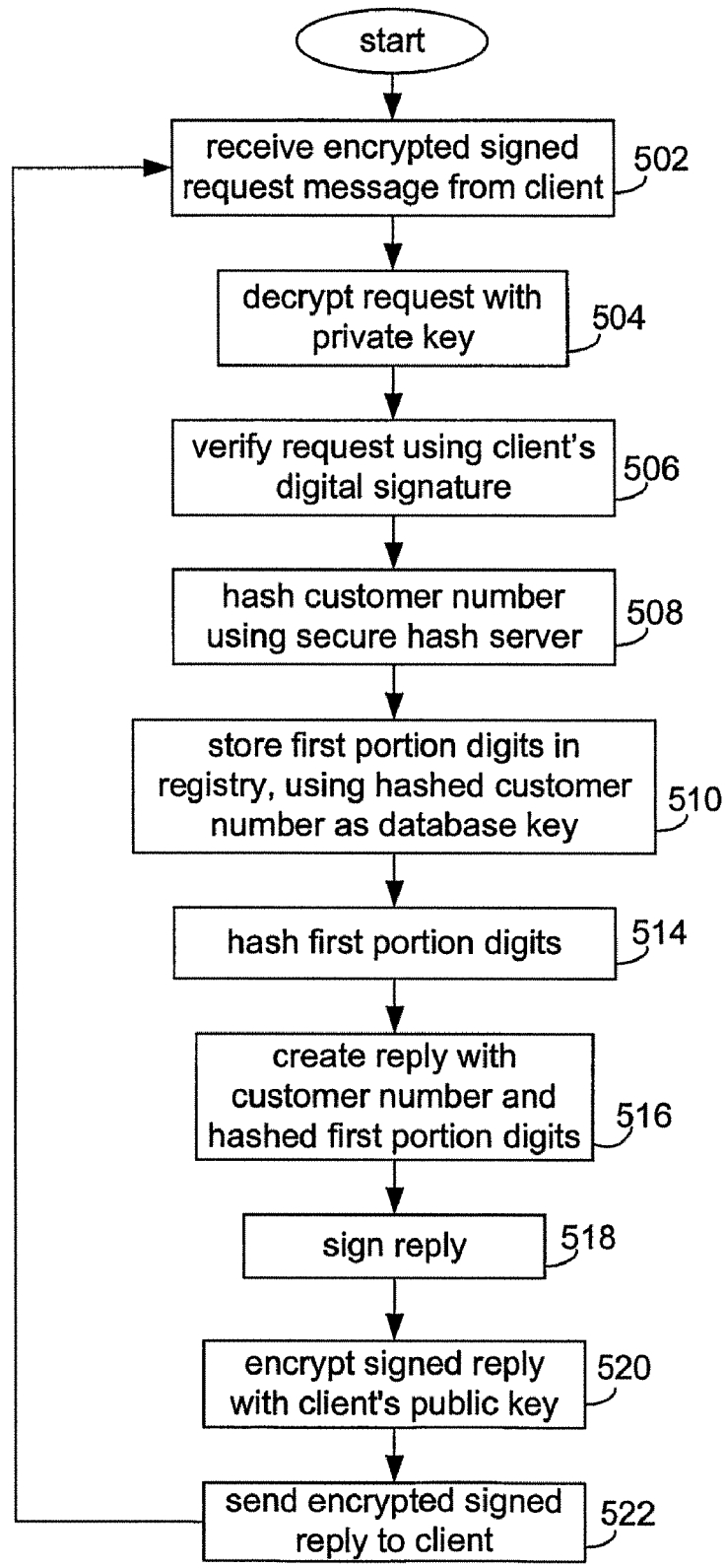
FIG. 5 is a flow diagram of an information storage server process executed by the information server.

As the client system 104 waits for the reply, the information server 102 executes an information storage server process, as shown in FIG. 5. At step 502, the encrypted message sent from the client 104 is received by the information server 102. At step 504, the message is decrypted using the information server's private key. Once decrypted, the contents of the message are verified using the digital signature of the client system 104 at step 506. This includes decrypting the signature to obtain the hash value included in the message. The decryption process uses the client system's public key, which, assuming the client system 104 has not been compromised, confirms that the message originated from the client system 104. Then a hash value is generated from the message contents (ignoring the digital signature itself), and compared with the hash value received from the client system 104. If the two hash values are identical, this indicates that the message remains intact and has not been altered in transit or otherwise corrupted. The information server 102 has now verified the message, and has the customer number and middle eight digits of the credit card number, as follows:

| | |
|---|---|
| 1025543 | 3495 2341 |

At step 508, the customer number is hashed using the secure hash server 106. That is, the customer number is sent to the secure hash server 106 over the Internet 110 using TCP/IP. All communications between the information server 102 and the secure hash server 106 are digitally signed and encrypted, as described above, to further enhance security. The secure hash server 106 generates a hash value from the customer number using a robust one-way cryptographic hash function known only to the secure hash server 106. For example, the secure hash server 106 could provide the following one way transformation between the customer number and a corresponding hash value:

| | | |
|---|---|---|
| 1025543 | hashes to | 2093 8408 |

Hash functions that may be used include standard hash functions such as MD5, available from RSA at www.rsa.com, but the hash function is preferably a non-standard, undisclosed hash function so that even if both the client system 104 and the information server 102 were compromised, a third party would still not be able to match records from the customer database 204 and the registry 304. Such a preferred hash function may be based on modifications of standard hash functions. For example, a hash function that first exchanges selected digits of the customer number and then uses this as input to an MD5 hash function could be used.

The resultant hash value is sent from the secure hash server 106 to the information server 102, where it is used as a database key for storing the middle eight digits of the customer's credit card number at step 510. That is, the partial credit card number is stored in the registry 304, indexed by the hashed customer number, as follows:

| Key | Data |
|---|---|
| 2093 8408 | 3495 2341 |

The secure hash server 106 is used rather than a hash function stored on the information server 102, in order to provide enhanced security by physically separating the hash function from the partial credit card storage.

At step 514, the credit card digits are hashed using the secure hash server 106; for example:

| | | |
|---|---|---|
| 3495 2341 | hashes to | 9394 2934 |

At step 516, the hashed credit card digits are included in a reply message with the customer number. At step 518, this reply message is digitally signed. This includes creating a hash value for the customer number and hashed credit card digits, and encrypting the resulting hash value using the private key of the information server (IS) 102. The message then appears as follows:

| | | |
|---|---|---|
| 1025543 | 9394 2934 | Signature of IS |

At step 520, this message is encrypted with the client system's public key, and the encrypted reply is sent to the client system 104 at step 522.

Returning to FIG. 4, the received encrypted reply is decrypted using the client system's private key at step 414, and the reply is verified, as described above, at step 416. At step 418, the encoded credit card digits included in the reply are combined with the second portion of the credit card number, to form an encoded, and presumably invalid, credit card number for the customer. At step 420, the encoded credit card number is stored in the customer database 204, indexed by the customer number as a database key, as follows:

| | |
|---|---|
| Customer number: | 1025543 |
| ... | ... |
| Card number: | 3647 9394 2934 1942 |
| ... | ... |

Consequently, theft of the customer database 204 will not provide valid credit card numbers.

Similarly, the registry 304 stored on the information server 102, appears as follows:

| Key | Data |
|---|---|
| ... | ... |
| 2093 8408 | 3495 2341 |
| ... | ... |

As only the first portion of the credit card number is stored in the registry 304, theft of the registry 304 also does not provide credit card numbers. Moreover, because the registry 304 is indexed by the hashed customer number, there is no apparent direct link between the credit card portion stored in the registry 304 and the complementary portions stored in the customer database 204. In order to reconstruct the credit card numbers, a thief would need to have access to the customer database 204, the registry 304, the hash function used by the secure hash server 106, and would need to know how to combine the two portions.

Although the described embodiment includes dividing the credit card number in a relatively simple manner by extracting the middle eight digits, the credit card number could alternatively be divided in more complex ways by, for example, extracting every alternate digit. Moreover, this could be made even more complex by making the dividing sequence essentially unique for each customer, such as by making it depend upon some other attribute of the customer information. For example, the credit card number could be divided by taking a pseudo-random sample of the digits derived from some other attribute, for example, the customer's birth date, or a hash of the customer's name, and so on. It will be apparent that many complex divisions can be used, making it extremely unlikely that a party having access to both databases would be able to reconstruct credit card numbers without also having access to the sequence generation process code. Consequently, the information storage system provides a greatly enhanced level of security over prior art storage systems.

The information server 102 may be owned and operated by the same organisation that owns and operates the client system 104, but may be alternatively owned by a second organisation that provides information storage services to client organisations for a fee. In order for the client organisation to make use of the customer credit card number, it must, of course, be reassembled at some point in order to process a credit card transaction. Transaction processing is performed using a transaction process, comprising a client transaction process of the client modules 202 executed by the client system 104, and a transaction server process of the server modules 302 executed by the information server 102. Two preferred embodiments of the transaction process are provided, as described below.

Figure 6:
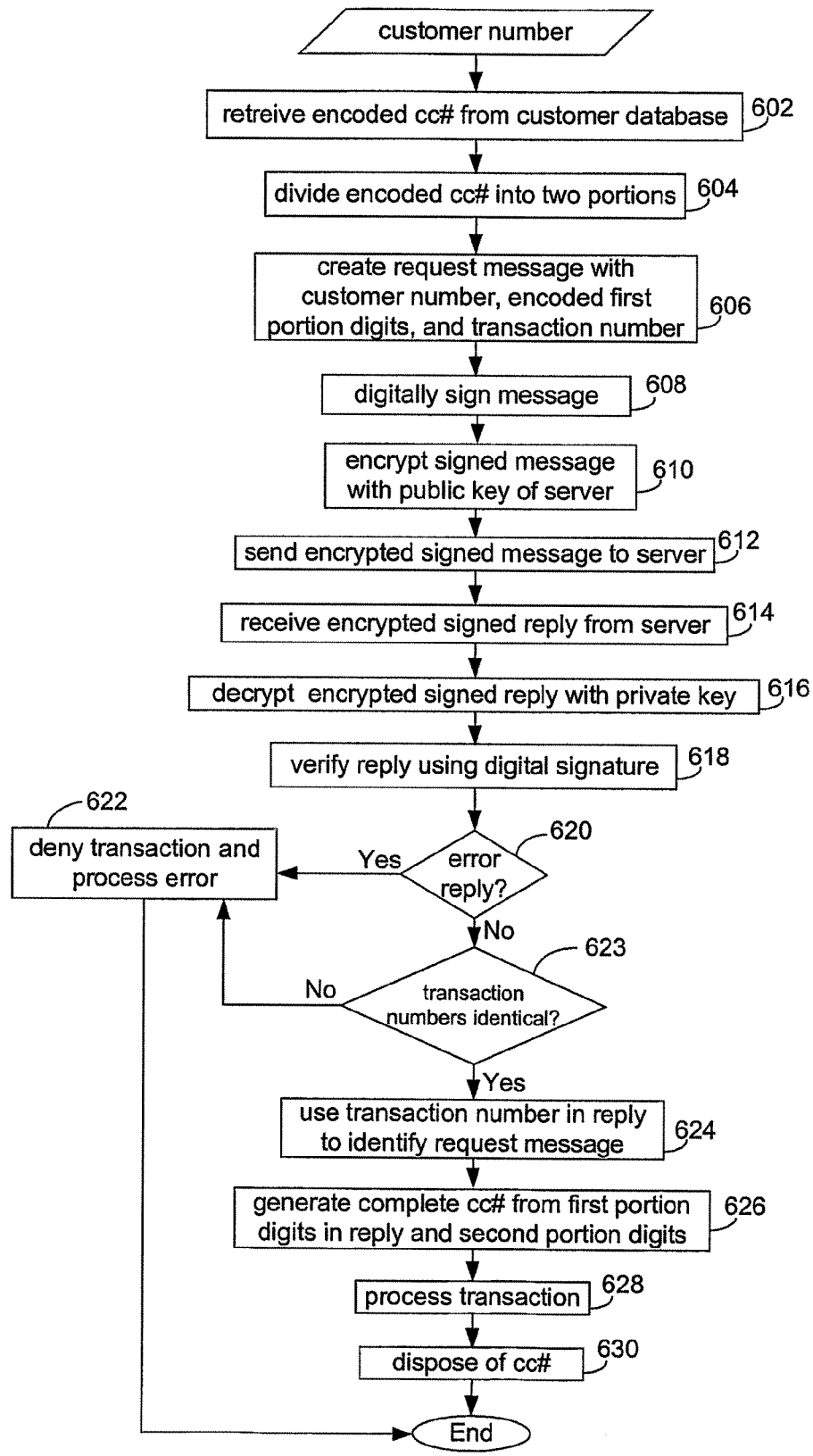
FIG. 6 is a flow diagram of a first preferred embodiment of a transaction client process executed by the client system.

In a first preferred embodiment of the transaction process, the client system 104 executes a client transaction process, as shown in FIG. 6. A customer of the organisation will have incurred charges, by ordering products and/or services of the client organisation, for example. This might be achieved through a customer using a web browser application executing on a computing device to access a web server and transaction engine (not shown) of the client system 104 via the Internet 110, for example, or by some other standard method. The customer's transaction is initially identified by at least the customer's identification number and a transaction amount. The client transaction begins at step 602 when the encoded credit card number of the customer is retrieved from the customer database 204. At step 604, the encoded credit card number is split into two portions, being the encoded portion and the unencoded portion, as described above. At step 606, a request message is created including the customer number, the encoded (hashed) portion of the customer credit card number, and a unique transaction number assigned to the transaction, as follows:

| Customer Number | Encoded Credit Card digits | Transaction number |
|---|---|---|
| 1025543 | 9394 2934 | 99594 |

Figure 7:
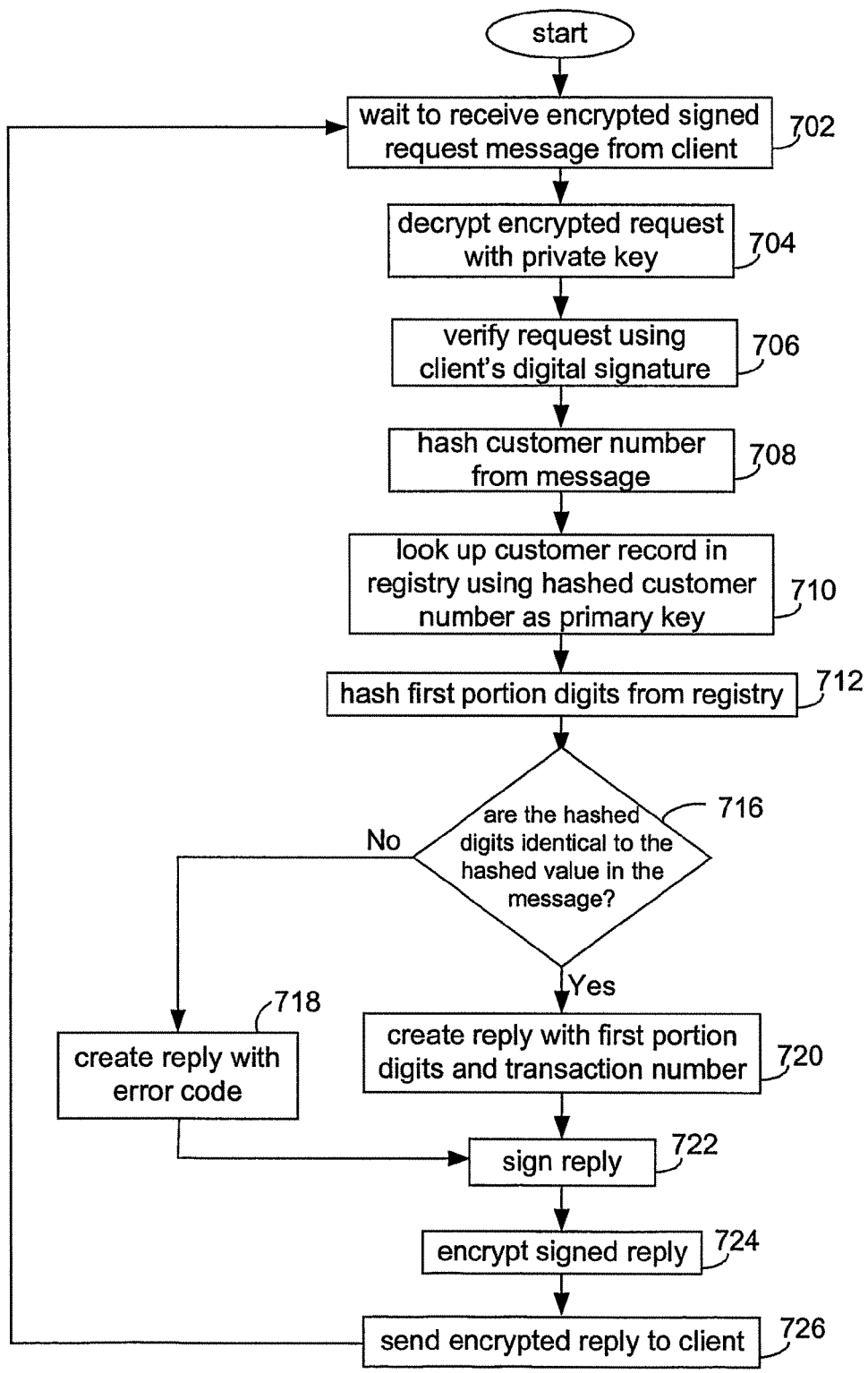
FIG. 7 is a flow diagram of a first preferred embodiment of a transaction server process executed by the information server.

The message is then digitally signed, encrypted with the public key of the information server 102, and sent to the information server 102, at steps 608 to 612, respectively. At step 614, the process waits to receive a reply from the information server 102. In the meantime, the information server 102 executes a server transaction process, as shown in FIG. 7. After receiving the encrypted message at step 702, the message is decrypted with the information server 102's private key, at step 704, and the decrypted message is verified at step 706 using the client system 104's digital signature. At step 708, the customer number is hashed to generate a database key for the registry 304. At step 710, this key is used to retrieve the first portion of the customer's credit card number from the registry 304. At step 712, the retrieved partial credit card number is hashed, and at step 714, the hashed partial credit card number is compared to the hashed value in the message. If these two values are not equal, then a reply message is created at step 718, containing an error code indicating that the customer data was not valid. Alternatively, if the values are equal, then at step 720 a reply is generated including the partial credit card number and the unique transaction number, as follows:

| | |
|---|---|
| 3495 2341 | 99594 |

In either case, the reply is digitally signed, the signed reply is encrypted using the public key of the client system 104, and the encrypted signal reply is sent to the client system 104, at steps 722 to 726, respectively.

Returning to FIG. 6, the reply is decrypted at step 616 using the private key of the client system 104, and the reply is then verified, at step 618. If, at step 620, it is determined that the reply indicates an error, then at step 622 the transaction is denied and the error is processed, and the client transaction process then terminates. Alternatively, if the reply did not indicate an error, then at step 623 the transaction number in the reply is compared with the transaction number in the original message, to confirm that they are identical. If not, then at step 622 the transaction is again denied and the error is processed. Otherwise, at step 624 the transaction number returned in the reply is used to determine the corresponding request message. (Although the client transaction process of FIG. 6 is shown as a single process, the generation and sending of a request message on the one hand and the processing of replies on the other hand can be executed as separate processes due to the latencies of the various components of the system.)

At step 626, the customer's complete credit card number is reconstructed from the first portion contained in the reply received from the information server 102, and the second portion from the customer database 204. At step 628, the transaction is processed using the transaction modules 208 of the client system 104. This requires transmission of the complete credit card number to the transaction server 108, which is owned and operated by a transaction acquirer, such as a bank. This communication of the complete credit card number is the only time that the complete credit card number is transmitted by the information storage system. This transmission is preferably secured by including a digital signature of the client system 104, and encrypting the message with the public key of the transaction server 108, but can alternatively be secured by other methods used by the transaction acquirer. To further enhance security, the complete credit card number may be sent via a private network rather than a public communications network such as the Internet 110.

Once the transaction details have been sent to the transaction acquirer, the credit card number is destroyed at step 630, and the client transaction process ends.

Figure 8:
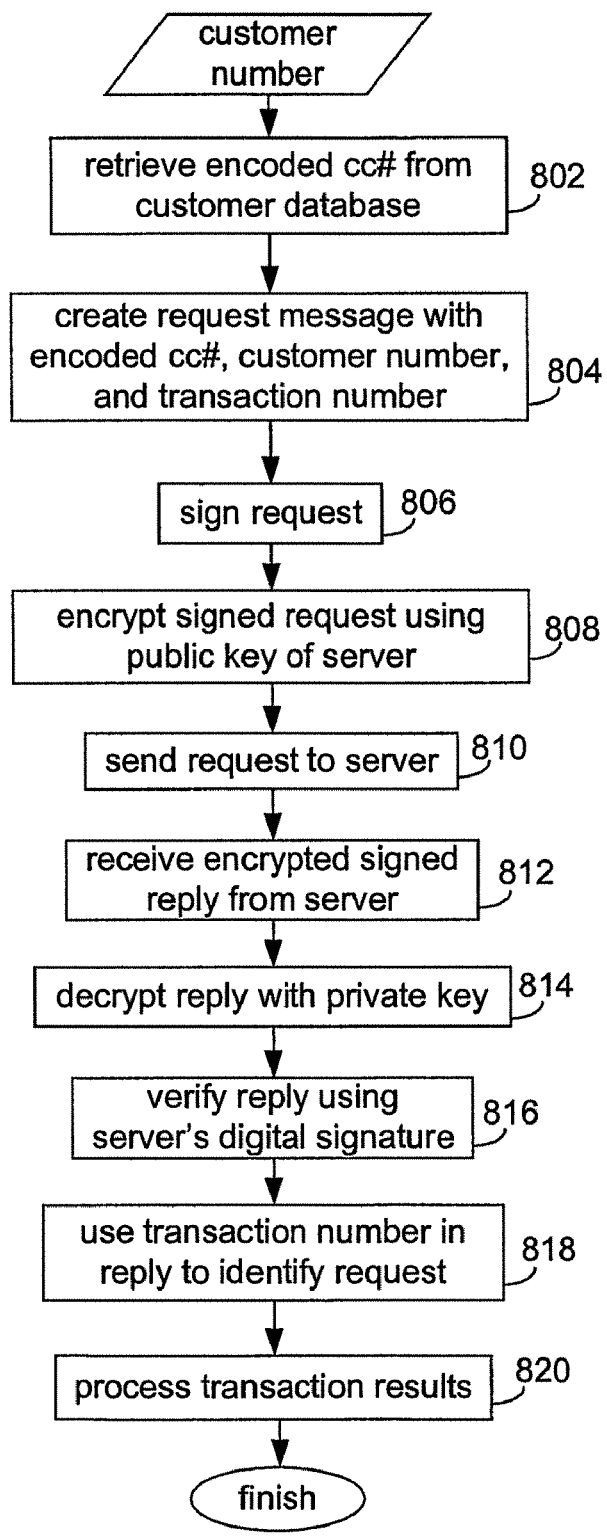
FIG. 8 is a flow diagram of a second preferred embodiment of a transaction client process executed by the client system.

In a second preferred embodiment of the transaction process, the transaction processing is performed by the information server 102, rather than by the client system 104. In this embodiment, the client system 104 executes a client transaction process as shown in FIG. 8. At step 802, the customer's encoded credit card number is retrieved from the customer database 204. At step 804, a request message is constructed including the encoded credit card number, the customer number, and the transaction number as follows:

| Encoded Credit Card number | Customer Number | Transaction number |
|---|---|---|
| 3647 9394 2934 1942 | 1025543 | 99594 |

Figure 9:
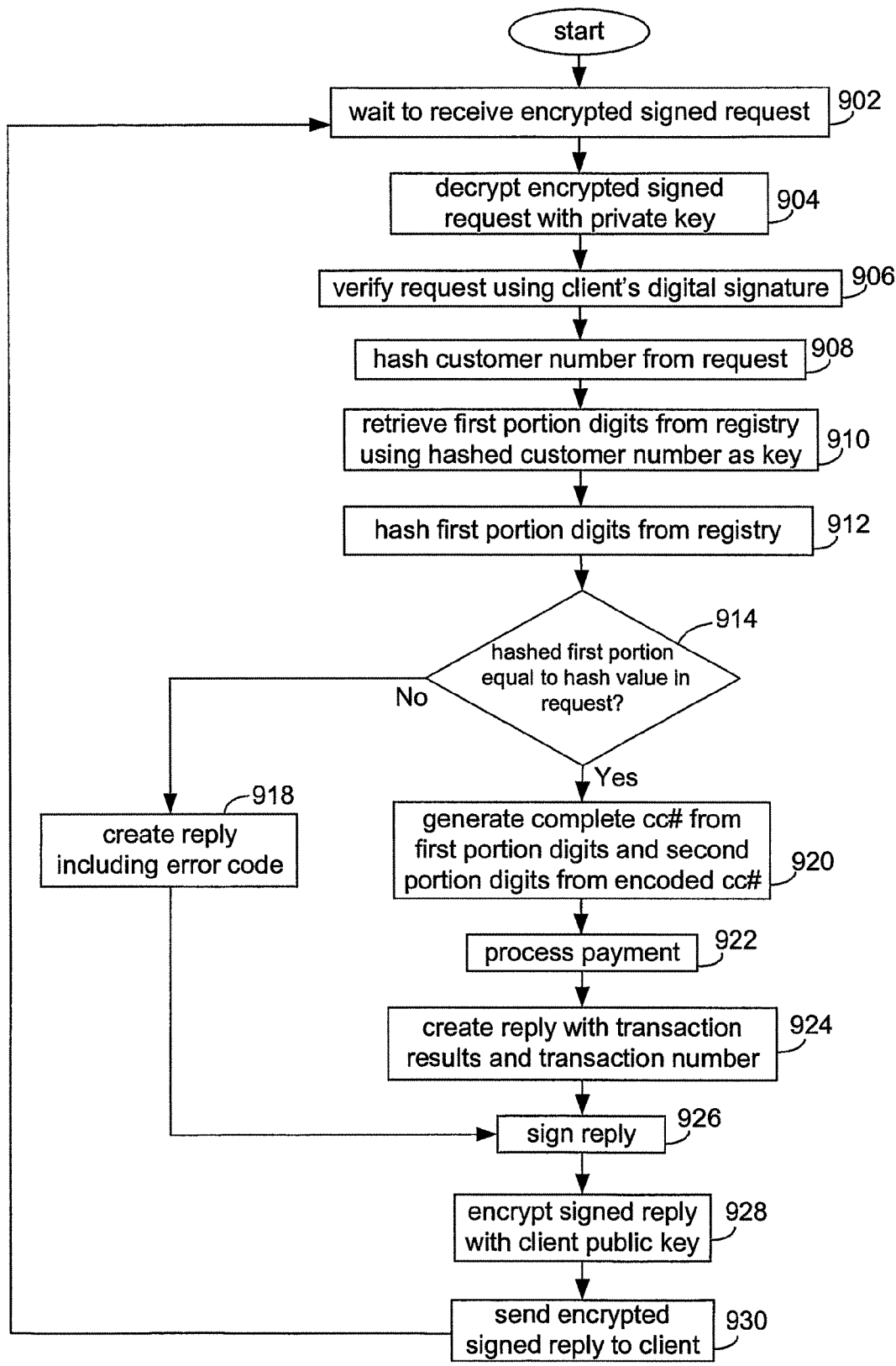
FIG. 9 is a flow diagram of a second preferred embodiment of a transaction server process executed by the information server.

This request message is then signed, encrypted, and sent to the information server 102 at steps 806 to 810. While the client system 104 waits to receive a reply from the information server 102 at step 812, the information server 102 executes a server transaction process, as shown in FIG. 9. As in the first preferred embodiment, the message is received, decrypted, and verified at steps 902 to 906, and the customer number is hashed using the secure hash server 106, at step 908. At step 910, the resulting hash value is used as a database key for retrieving the middle eight digits of the customer's credit card number from the registry 304, as follows:

| | | |
|---|---|---|
| 1025543 | hashes to | 2093 8408 |

| Key | Data |
|---|---|
| 2093 8408 | 3495 2341 |

At step 912, these middle eight digits are hashed using the secure hash server 106, and at step 914, this hash value is compared with the hash value provided by the middle eight digits of the encoded credit card number included in the message received from the client system 104. If the hash values are not equal, then at step 918 a reply message is created, including an error code indicating that the customer data was not valid. Alternatively, if the values are equal, then at step 920 the customer's complete credit card number is reconstructed. At step 921, the transaction modules 208 of the information server 102 are used to send the transaction details, including the complete credit card number, over the Internet 110 to the transaction server 108 for final processing. At step 922, the reconstructed credit card number, having been used, is destroyed. At step 923, the transaction results are received from the transaction server 108 over the Internet 110. Alternatively, if the information server 102 is owned and operated by the same organisation that owns and operates the transaction server 108, then communication of the customer's complete credit number can be entirely within a secure internal network of the organisation. After the transaction is complete, a reply message is constructed at step 924 including the transaction results, and the unique transaction number, as follows:

| Transaction results | 99594 |
|---|---|

The reply is then digitally signed, encrypted using the client system's public key, and sent to the client system 104 at steps 926 to 930.

Returning to FIG. 8, the encrypted signed reply message is received at step 812, decrypted at step 814 and its content verified at step 816. At step 818, the transaction number included in the reply is used to identify the corresponding request, as described above. At step 820, the transaction results are processed as required. The transaction data can be keyed by the unique transaction number. Any interception of the reply message in and of itself provides insufficient information to be useful to a third party. Furthermore, the client system 104 never has access to the complete credit card number.

Figure 10:
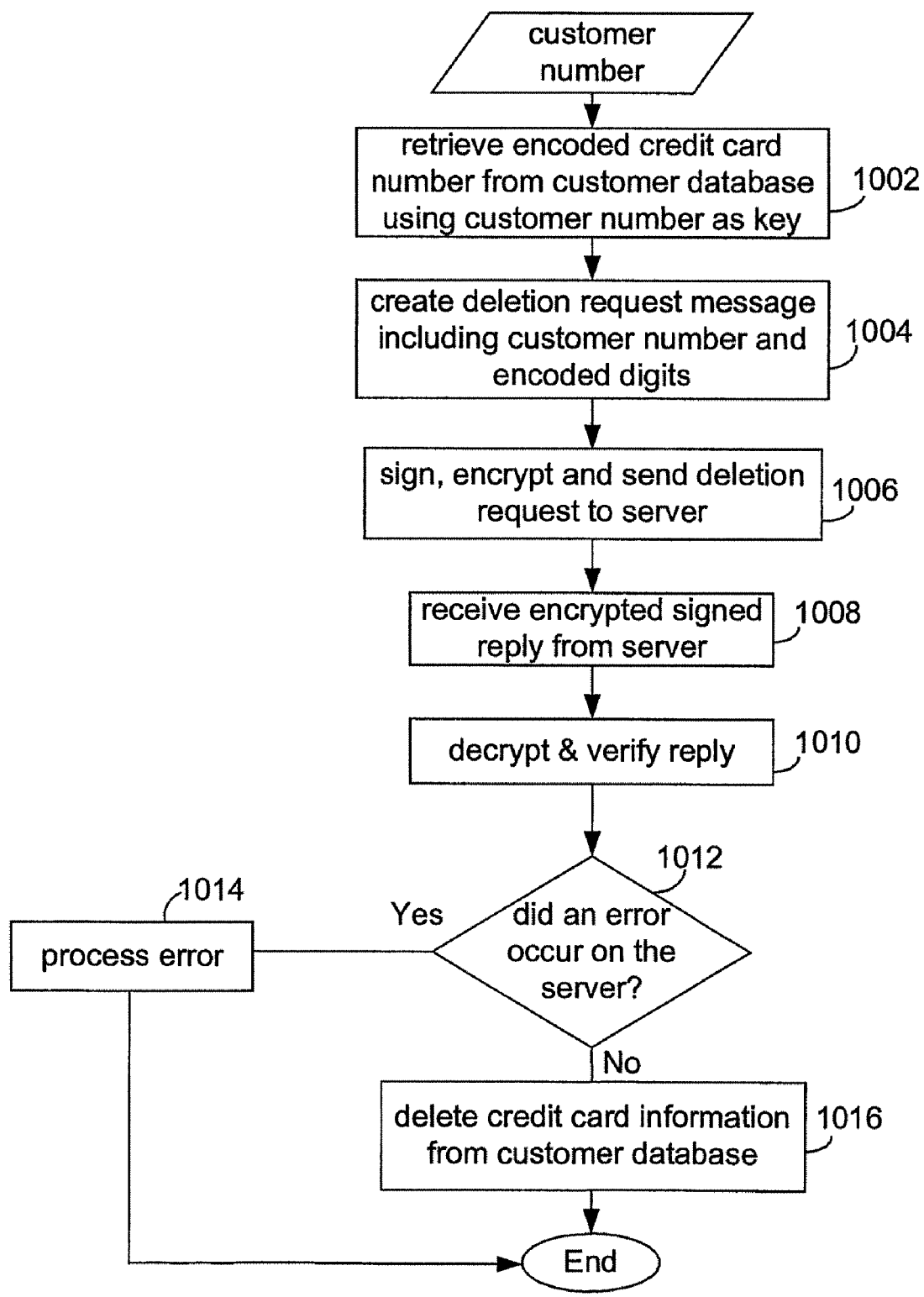
FIG. 10 is a flow diagram of an information deletion client process executed by the client system.
Figure 11:
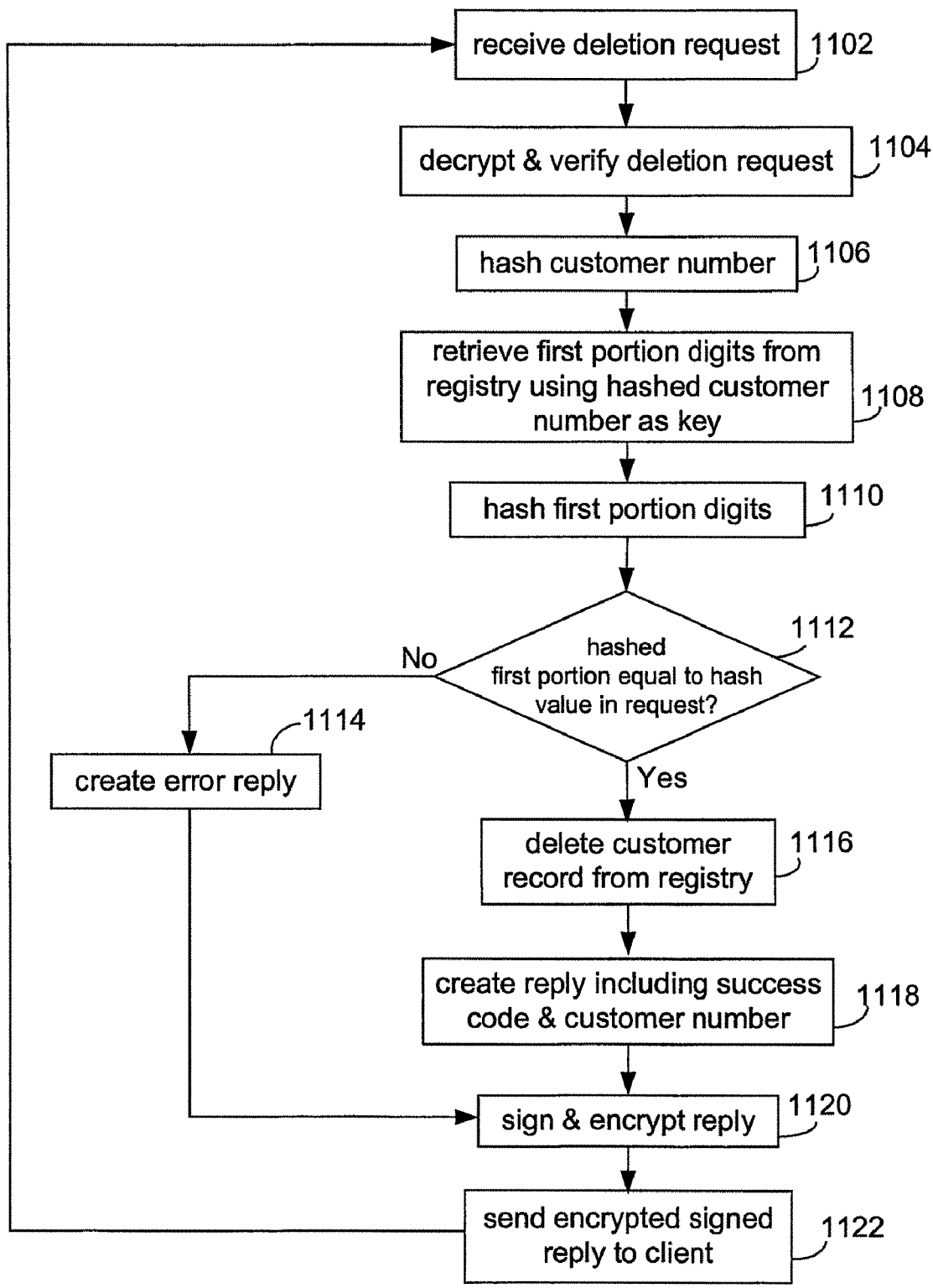
FIG. 11 is a flow diagram of an information deletion server process executed by the information server.

It is sometimes necessary to delete a customer's credit card information from the information storage system, for example, if the customer cancels their account with the client organisation. This is achieved through an information deletion process, comprising a client deletion process executed by the client computer 104, and a server deletion process executed by the information server 102. In order to delete a customer's credit card information, the client system 104 executes a client deletion process, as shown in FIG. 10. In order to delete a customer's credit card information, the customer number is provided to the process, and the customer's encoded credit card number is retrieved from the customer database at step 1002. At step 1004, a deletion request message is created including the customer number and the encoded digits of the customer's credit card number. At step 1006, the message is signed, encrypted and sent to the information server 102, as described above. The information server 102 executes a server deletion process, as shown in FIG. 11. The information server 102 receives the deletion request message at step 1102. At step 1104, the message is decrypted and verified. At step 1106, the customer number included in the message is hashed using the secure hash server 106, and at step 1108, the hash value is used as a database key to retrieve the customer's credit card digits from the registry 304. At step 1110, these digits are hashed and the hash value is compared to the hash value included in the deletion request message. If, at step 1112, the values are not found to be equal, then an error reply message is created at step 1114. Otherwise, at step 1116, the record in the registry 304 containing the customer's credit card digits is deleted, and at step 1118 a reply message is created, indicating the customer's data has been successfully deleted, and including the customer number as follows:

| deletion success code | 1025543 |
|---|---|

In either case, the reply message is signed and encrypted at step 1120, as described above. The encrypted signed reply message is sent to the client system 104 at step 1122. Returning to FIG. 10, the reply message is received from the server 102 at step 1008. The message is decrypted and verified at step 1010. If, at step 1012, the message indicates that an error occurred on the information server 102, then the appropriate error processing is performed at step 1014, and the process ends. Otherwise, at step 1016, the customer's credit card information is removed from the customer database 204, and the process ends.

Significantly, at no point in the deletion process does either the client server 104 or the information server 102 have access to the complete credit card number. Furthermore, interception of the messages between the client system 104 and the information server 102 cannot be directly used to obtain a customer's credit card number.

The information storage system provides a number of benefits, some of which have been discussed above. For example, although compromise of the information server 102 or the client system 104 could also compromise those customer credit card accounts that were charged (for compromise of the information server 102) or first entered (for compromise of the client system 104) during the period of compromise, this would still not compromise the credit card accounts of other customers, because at no point would all of the credit card information be compromised. Compromise of both the customer database 204 and the registry 304 does not compromise credit card numbers, because the secure hash server 106 is required to associate data records in the customer database 204 and the registry 304. Loss of the registry 304 would make it impossible to process transactions. For this reason, remote and secure mirroring of the registry 304 is preferred. Similarly, loss of the secure hash server 106 would make it impossible to process transactions. However, backups of the secure hash server 106 would address this issue.

The system uses public key cryptography to render the links between the client system 104 and servers 102, 106, 108 secure, so as to provide authentication of the sender and the integrity and privacy of the message. These safeguards are used because of the desirability of separating the two databases physically, and the attendant risk of compromise of communications.

Although the preferred embodiments have been described above in terms of stored credit card numbers, it will be apparent that the system is applicable to any kind of information that meets a number of criteria. First, the information can be split into two or more parts, any of which is without value in the absence of the other or others. By way of example, it could not be used to protect a list of credit card numbers by splitting the list in two, because each part of the list, although not as long as the full list, would retain value regardless of the loss of the other. Secondly, the information must be able to be divided so as to make regeneration of any missing part implausible. The more difficult this regeneration, the better the protection.

For example, a credit-card with 8 missing digits would be able to be regenerated using trial and error by cycling through all the possible combinations, but at one attempt per second, this would take over three years. A credit card number cannot be protected, however, by splitting off a single digit, because credit card numbers are formulated using a check-digit system, and a single missing digit can be re-generated from the other 15 digits. Another example: a credit-card expiry date would be protected only extremely weakly using this system. As a four digit quantity (e.g., 03/02) with only one bit of information in the first digit (always a 0 or a 1) and at most two bits in the fourth digit (because credit cards are typically issued to expire at most three years in the future), there are few possibilities. If the first two digits are split away, there are at most four possibilities for the second two. If the first and the fourth are split off, there are only six possibilities. This four-digit quantity cannot be adequately protected using the information storage system unless it is first pre-processed.

Such pre-processing can be done in many ways: one example is the generation of a random sequence of the digits from 0 to 9 (for example, "4960582713") and a key (in this case "4947") giving the offsets of the digits required. In this example, the offsets provide the fourth, ninth, fourth and seventh digits of the sequence, yielding "0302". Thus, the four-digit quantity can be encoded as a combination of the random sequence and the key. Thus the four-digit key can be combined with the random sequence in some way (e.g., the four-digit key could be used as a prefix or suffix, or inserted into the random sequence at an intermediate position, to form a fourteen digit number), and the resulting number can be divided into a first portion and a second portion, as described above. Using this method, data with as little information content as a single binary digit or bit (a 0 or a 1) can be protected, for example, by generating a 32-bit random number and an offset representing the bit of interest.

The information storage system can be used to protect many kinds of valuable information. For example, it can be used to securely store account numbers (e.g., bank account numbers), financial quantities (e.g., account balances), names (e.g., cardholder information, patient names), and so on. Moreover, the system can be used to protect multiple pieces of information in one application, for example, in the credit card example, protecting cardholder details in addition to the credit card number.

Due to the seemingly arbitrary arrangements of numeric information (such as credit card and account numbers), they are well suited to division and separate storage. In contrast, textual and certain other kinds of information are not in general so well suited to division because each component may be 'readable' to some degree, depending upon how the information is divided. However, if the information is first scrambled or otherwise encoded in some manner that makes it unintelligible without the appropriate decoding step, then the system can be used to effectively divide and store the encoded information. Moreover, most encoding methods require the encoded information to be complete and intact in order to be decoded. In particular, an encrypted item of information, such as an encrypted document, cannot be decrypted if the encrypted document is not complete. Accordingly, a document could be encrypted and then divided into portions that are stored separately, as described above.

This provides secure storage of documents with arbitrary content. It will be apparent that this process is not restricted to text documents, but can be used to securely store any type of information or data that can be represented electronically.

Finally, the splitting into two components is simple and in most cases sufficient. However, it will be apparent that the system can be extended to divide information into more than two components, further reducing the risk of compromise by collusion. However, it will be apparent that it is not necessary to use further division at all. Any method that generates two or more components from input information, from which the input information can be re-generated, and where the components are not in themselves useful, valuable, or intelligible (as the case may be) can be used.

The potential for temporary failure of the system due to unavailability of access to a working server (e.g., the information server 102 or the secure hash server 106) can be reduced by the use of multiple synchronised servers. This increases the overall availability of the system, but introduces additional complexity in managing connections to multiple servers and their synchronisation. However, techniques to synchronise multiple servers are known and established.

For example, to manage such complexity, the functionality of the client system 104 can be divided so as to separate the handling of the interaction with multiple servers (and their synchronisation) from other parts of the client functionality, creating a three-tier architecture: client(s), gateway, and server(s).

Such communication with multiple servers can involve potentially quite remote servers, accessed, for example, using the Internet. Such communication often involves substantial latencies, and in these circumstances it can be advantageous to group together batches of transactions for handling as a group. In this way a series of transactions to be carried out is sent as a batch to a server (or servers), where they are processed and the results of each transaction are then bundled and returned together to the client. Where the communication latency is large in comparison with transaction processing time on the server, this approach can result in significantly improved performance.

As described above, any compromise of the customer database 204 alone is ineffective (in that no sensitive information is contained in that database alone), and for the same reason any compromise of the server registry 304 alone, or the customer database 204 and the server registry 304 together in the absence of access to the secure hash server 106 is also ineffective. Nevertheless, the information storage system may be vulnerable to a compromise of the client system 104 where such compromise is sufficiently extensive to enable access to the customer database 204 and provide authorised access to the information server 102, because such a compromise would allow a brute-force attack. The party gaining unauthorised access would be able to process the customer database 204, record by record, querying the information server 102 for the completion of each record in turn, and thus possibly defeating the protection offered by the information storage system.

There are several methods that can be used to defeat or limit such compromise. Firstly, client access can be limited by rules appropriate to the business of the owner of the customer database 204. Such rules can include limitations by time of day, day of week, source IP address, and transaction frequency or velocity (number of transactions in a certain time period), either alone or in combination. The consequences of an attempted or actual breach can include denial of access, slowing of access, or the raising of alarms, either together or in combination. Furthermore, methods such as transaction throttling (enforcing a minimum time between transactions) can make such brute-force approaches ineffective and can lead to the consequences described above, including the raising of an alarm, enabling the detection of the compromise.

When data on the information server 102 is updated (such as when a customer of an organisation using the system informs the organisation of his or her new credit card number), there is no requirement that the previously valid data be deleted. Transparently to the client system 114, the information server 102 can keep track of any number of old versions of data by version or by timestamp, rather than over-writing them with the updated information each time. This approach of data "versioning" in the information server 102 can give the client system 104 access to such facilities as roll-back of transactions very simply. Equally importantly, it can make the checkpointing of databases by time or by version easy to implement.

There is no requirement to use all of the information in the output (the hash digest) produced by the secure hash server 106: it can be readily identified that the size (number of bits) in the output of the secure hash server 106 is only that required to make co-incidental matches unlikely. The use of 64 bits (for example) is more than sufficient in most cases for this purpose, whereas common hash functions produce between 160 and 1024 bits in their output digests.

The interposition of a transformation function (whether a simple subsetting function, such as the use of only the first 64 bits, or something more complex) can be used to provide a mechanism where an entire database can be re-keyed effectively instantly: something that might well be required in the event of a compromise of a client database. This re-keying can be done by storing the entire digest with each record, but comparing only against the output of the transformation function. Re-keying of a database of essentially arbitrary size can be achieved effectively instantly by simply changing the transformation function.

Many modifications will be apparent to those skilled in the art without departing from the scope of the present invention as herein described with reference to the accompanying drawings.

The invention claimed is:

1. A system for protecting digital data, including;
   a first computer system for generating first data and second data from said digital data, such that said digital data can be generated from said first data and said second data, and use of said digital data is infeasible with only one of said first data and said second data, and for storing an identifier with said first data; and
   a second computer system for storing said second data with an encoded identifier generated from said identifier.

2. A system as claimed in claim 1, wherein said second computer system is adapted to send an encoded version of said second data to said first computer system, and said first computer system is adapted to generate an encoded version of said digital data from said first data and said encoded second data, and to store the encoded digital data with said identifier.

3. A system as claimed in claim 2, including a remote hash generator for generating the encoded second data.

4. A system for protecting digital data, including:
   a first computer system for storing an encoded version of said digital data and an identifier, the encoded digital data having been generated from first data of said digital data and an encoded version of second data of said digital data, wherein said digital data can be generated from said first data and said second data, and use of said digital data is infeasible with only one of said first data and said second data; and
   a second computer system for storing said second data and an encoded identifier generated from said identifier;
   wherein said first computer system is adapted to send at least the encoded version of the second data to said second computer system.

5. A system as claimed in claim 4, including a plurality of said second computer system, and a gateway for selecting at least one of the second computer systems, and for forwarding data received from said first computer system to the selected at least one second computer system.

6. A process, executed by a first computer system, for protecting digital data, including:
   generating first data and second data from said digital data, such that said digital data can be generated from said first data and said second data, and use of said digital data cannot be performed using only one of said first data and said second data;
   sending said first data to a second computer system for storage with an encoded identifier generated from an identifier; and
   storing said second data with said identifier.

7. A process as claimed in claim 6, including generating encoded data from said digital data, wherein said first data and second data are generated from said encoded data.

8. A process as claimed in claim 7, wherein the quantity of said encoded data is substantially larger than quantity of said digital data.

9. A process as claimed in claim 7, wherein said step of generating includes encrypting said digital data.

10. A process as claimed in claim 6, wherein said first data and said second data are stored at respective locations physically remote from one another.

11. A process as claimed in claim 6, wherein said encoded identifier includes a cryptographic hash of said identifier.

12. A process as claimed in claim 11, wherein said hash is remotely generated using a hash function unknown to said first computer system and unknown to said second computer system.

13. A process as claimed in claim 6, including:
   receiving an encoded version of said first data from said second computer system; and
   generating an encoded version of said digital data from the encoded first data and said second data; and
   wherein said step of storing includes storing the encoded digital data and said identifier.

14. A process for protecting digital data, including:
   receiving an identifier and first data from a computer system having second data, said first data and said second data being such that said digital data can be generated from said first data and said second data, and use of said digital data cannot be performed using only one of said first data and said second data;
   storing said first data with an encoded identifier generated from said identifier, without storing said identifier;
   generating encoded first data from said first data; and
   sending said encoded first data to said computer system for storage with said second data and said identifier.

15. A process for generating digital data, including:
   determining, on the basis of an identifier, first data of said digital data;
   sending said identifier to a computer system;
   receiving second data of said digital data from said computer system, said second data determined on the basis of an encoded identifier generated from said identifier; and
   generating said digital data from said first data and said second data, wherein use of said digital data is infeasible with only one of said first data and said second data.

16. A process as claimed in claim 15, including using said digital data for said use and then destroying said digital data.

17. A process for generating digital data according to claim 16, wherein said digital data represents a credit card number and said use includes processing a financial transaction on the basis of said credit card number.

18. A process for generating digital data, including:
   receiving an identifier;
   determining first data of said digital data on the basis of an encoded identifier generated from said identifier; and
   sending said first data to a computer system to enable said digital data to be generated from said first data and second data of said digital data, wherein said use of said digital data is infeasible with only one of said first data and said second data.

19. A process for generating digital data, including;
   determining, on the basis of an identifier, an encoded version of said digital data, the encoded digital data having been generated from first data of said digital data and an encoded version of second data of said digital data; and
   sending said identifier and said encoded digital data to a computer system for generation of said digital data from said first data and said second data, wherein said use of said digital data is infeasible with only one of said first data and said second data.

20. A process, executed by a computer system, for generating digital data, including:
- receiving an identifier and an encoded version of said digital data;
- determining first data of said digital data on the basis of an encoded identifier generated from said identifier;
- determining second data from an encoded version of said digital data;
- generating said digital data from said first data and second data, wherein use of said digital data is infeasible with only one of said first data and said second data;
- using said digital data; and
- destroying said digital data.

21. A digital data storage system having components for executing the steps of any one of claims 6-20.

22. Computer-readable storage device having stored thereon program code for executing the steps of any one of claims 6-20.

* * * * *